(12) United States Patent
Goodno

(10) Patent No.: US 7,948,680 B2
(45) Date of Patent: May 24, 2011

(54) SPECTRAL BEAM COMBINATION USING BROAD BANDWIDTH LASERS

(75) Inventor: Gregory D. Goodno, Los Angeles, CA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 506 days.

(21) Appl. No.: 11/954,448

(22) Filed: Dec. 12, 2007

(65) Prior Publication Data

US 2009/0153968 A1    Jun. 18, 2009

(51) Int. Cl.
*G02B 5/18* (2006.01)
(52) U.S. Cl. ........................................ 359/568; 359/571
(58) Field of Classification Search .................. 359/571, 359/568
See application file for complete search history.

(56) References Cited

U.S. PATENT DOCUMENTS

| | | | |
|---|---|---|---|
| 4,281,905 A | 8/1981 | Harvey et al. | |
| 5,497,260 A | 3/1996 | Jurek et al. | |
| 6,212,310 B1 | 4/2001 | Waarts et al. | |
| 6,381,388 B1 | 4/2002 | Epworth et al. | |
| 6,591,040 B1 | 7/2003 | Dempewolf et al. | |
| 6,996,343 B2 | 2/2006 | Neilson | |
| 7,199,924 B1 | 4/2007 | Brown et al. | |
| 7,233,442 B1 | 6/2007 | Brown et al. | |
| 2001/0036002 A1 | 11/2001 | Tearney et al. | |
| 2005/0232182 A1 | 10/2005 | Shattil | |
| 2006/0077553 A1 | 4/2006 | Neilson | |

OTHER PUBLICATIONS

Bochove, E.J., "Theory of Spectral Beam Combining of Fiber Lasers", IEEE Journal of Quantum Electronics, vol. 38, No. 5, May 2002, pp. 432-445.
International Search Report and Written Opinion issued in PCT/US08/86213 on Jun. 4, 2009, 6 pages.

*Primary Examiner* — Joshua L Pritchett
(74) *Attorney, Agent, or Firm* — Rothwell, Figg, Ernst & Manbeck, P.C.

(57) ABSTRACT

The present invention provides systems and methods for spectral beam combination by applying a spatial chirp to each of a plurality of input beamlets using a respective plurality of dispersive elements and combining the spatially-chirped beamlets into a single collimated output beam using a dispersive element configured to remove the spatial chirp. In an embodiment, each dispersive element is a grating combined with a lens that is confocal to the grating and also confocal to a Fourier plane upon which a transverse distribution of beam spectral components is produced. A final lens-grating pair includes a lens and a grating, where the lens is confocal to the grating and also confocal to the Fourier plane.

5 Claims, 7 Drawing Sheets

US 7,948,680 B2

SPECTRAL BEAM COMBINATION USING BROAD BANDWIDTH LASERS

FIELD OF THE INVENTION

The present invention relates to spectral beam combination (SBC). More particularly, the present invention relates to SBC using broad bandwidth lasers.

BACKGROUND OF THE INVENTION

Spectral beam combination (SBC) is a promising concept for combining multiple lower power lasers to form a single, higher power beam. In SBC, each low power laser element emits a discrete wavelength beamlet, and the beamlets from the multiple lasers are combined using a spectrally dispersive element to form a monolithic output. This approach preserves the beam quality (BQ) of the individual beamlets, while enabling higher power scaling than can be obtained from single elements. Generally, beam quality is an assessment of how tightly a laser beam can be focused, and a diffraction-limited Gaussian beam achieves the best possible BQ. Various metrics are used to express beam quality, such as the beam parameter product (BPP), which is the product of the beam radius at the beam waist with the far-field beam divergence, the $M^2$ factor, which is the ratio of the beam's (second moment) bandwidth in the spatial frequency domain to the corresponding bandwidth of a Gaussian beam having the same beam radius at the waist, and the inverse $M^2$ factor.

Prior art SBC techniques typically require that each beamlet exhibits narrow spectral linewidth to prevent loss of BQ due to angular dispersion from the combining element. However, modern high-power (i.e., multi-kilowatt class) single-spatial-mode fiber lasers typically exhibit bandwidths on the order of 1 nm (~300 GHz), which prevents their ready use in SBC architectures. FIG. 1 depicts a prior art SBC concept that combines the outputs of wide bandwidth linear fiber laser array 10 into a combined, output beam 60 by focusing the discrete wavelength beams 12 onto a diffraction grating 40 using a Fourier transform lens 30 placed a focal distance f from array plane 12. Upon diffraction from grating 40, the discrete wavelength beams 12 propagate in the same direction and are combined into a single output beam 60. An optional output coupling mirror 50 can provide wavelength-selective feedback to each fiber in the array 10, although if the fiber lasers are configured as amplifiers with independently determined wavelengths then the output coupling mirror 50 is not needed. If the discrete wavelength input beams 12 are of narrow spectral bandwidth, then this system will increase the spatial brightness of the combined beam 60 over the brightness of the discrete wavelength beams 12. However, if the discrete wavelength input beams 12 are of broad spectral bandwidth, this increase in spatial brightness may be partially or completely offset by the reduction of spectral brightness due to the angular dispersion caused by diffraction grating 40. The broader the spectrum of each fiber laser element in the array 10, the more the spectral brightness—and, thus, the overall BQ of the combined beam 60 will be worsened by angular dispersion.

U.S. Pat. No. 7,199,924 discloses a method to overcome the angular dispersion imposed by SBC of broad bandwidth lasers by using two parallel gratings in series. The first grating imposes angular dispersion on an array of beamlets, resulting in their overlap on the second grating which removes the angular dispersion so that the beamlets are overlapped and co-propagating. While this method does indeed eliminate angular dispersion, it does so at the cost of transversely displacing the spectral content of each beamlet at the combination plane. This is known as imposing "spatial chirp" on the beamlet. This spatial chirp increases the beamlet spot size on the second grating without the concurrent decrease in the beamlet divergence that would normally occur during magnification. It can thus be seen that the BPP increases, corresponding to a loss of BQ. The loss of BQ from the spatial chirp is equivalent to the loss of beam quality that would have occurred due to angular dispersion.

While progress continues to be made in narrowing the bandwidth of high power fiber lasers, the present state of the art for narrow-band output, e.g., a few GHz, is below 1 kW. Accordingly, an improved SBC technique that combines the outputs of multiple, broad bandwidth lasers into a single beam that exhibits substantially the same BQ as each constituent beam is needed to combine fiber lasers with greater than 1 kW output powers, or equivalently to relax the requirement for narrow spectral bandwidth on the input fiber laser array at any power level.

SUMMARY OF THE INVENTION

It is a primary object of the present invention to provide systems and methods for spectral beam combination that overcome one or more deficiencies of the prior art described above.

The present invention achieves this object and others by providing systems and methods for spectral beam combination in which a spatial chirp is applied to each of a plurality of beamlets using one or more dispersive elements and the spatially-chirped beamlets are tiled at a Fourier plane before being combined into a single collimated output beam using one or more output gratings.

In accordance with a first aspect of the present invention, a system for combining a plurality of laser beamlets to form a single collimated output beam using spectral beam combination includes a plurality of broadband laser sources emitting a plurality of beamlets; a plurality of collimating lenses to collimate the plurality of beamlets; a spatial chirper configured to apply a spatial chirp to the collimated beamlets and to tile the spatially-chirped beamlets at a Fourier plane such that spectral components of the beamlets are transversely dispersed across the Fourier plane; and a dispersive beam combiner configured to remove the spatial chirp imposed by the spatial chirper and to combine the beamlets into a single collimated output beam.

In accordance with a second aspect of the present invention, a method for improving the beam quality of a spectral beam combination system includes the steps of emitting a plurality of laser beamlets from a plurality of broadband laser sources; collimating each beamlet using a respective plurality of collimating lenses; applying a spatial chirp to each beamlet using a spatial chirper including at least one dispersive element arranged to produce a transverse distribution of spectral beam components at a Fourier plane; and combining the spatially-chirped beamlets into a single collimated output beam using a combiner including at least one dispersive element arranged to remove the spatial chirp imposed by said spatial chirper.

Further objects and advantages of the present invention, as well as the structure and operation of various embodiments of the present invention, are described in detail below with reference to the accompanying drawings, in which like reference numerals are used to designate like components.

DETAILED DESCRIPTION OF THE PREFERRED EMBODIMENTS

Figure 1:
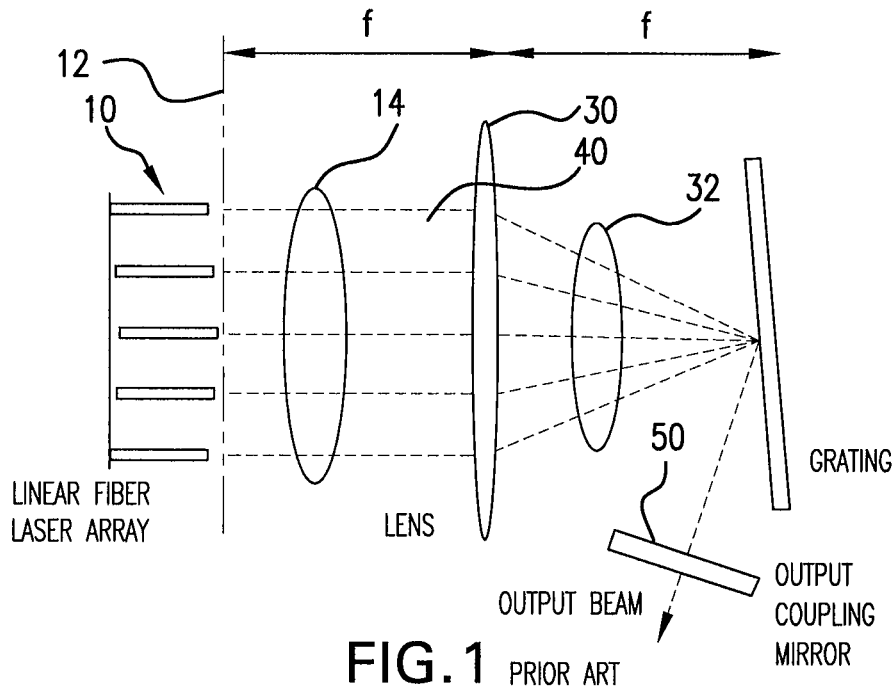
FIG. 1 depicts a prior art SBC concept.
Figure 2:
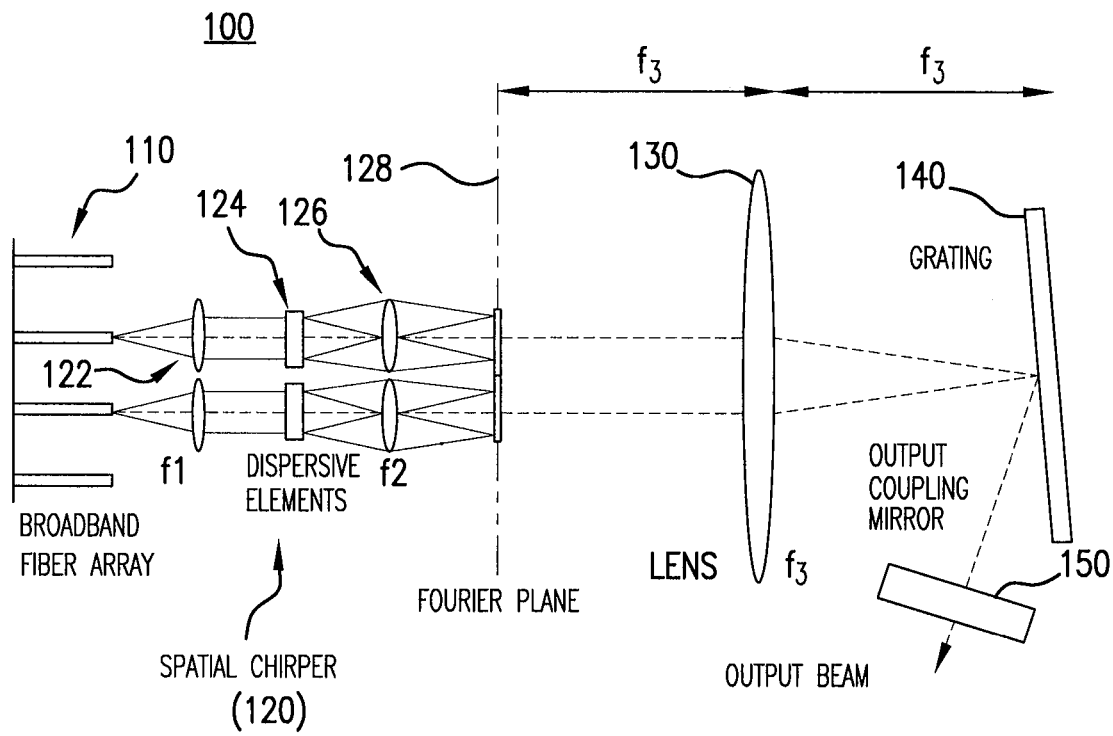
FIG. 2 depicts a broadband SBC system in accordance with an embodiment of the present invention.

An embodiment of a broadband SBC system 100 in accordance with the present invention is shown schematically in FIG. 2. The system 100 includes a broadband fiber array 110, a diffraction grating 140, an output coupling mirror 150, and a lens 130 positioned between the broadband fiber array and the diffraction grating to focus beamlets from the fiber array onto the grating, like the prior art system depicted in FIG. 1; however, in system 100, the angular dispersion imposed by the dispersive, beam-combining optic (i.e., diffraction grating 140) is corrected by pre-compensating each beamlet from broadband fiber array 110 by imposing a spatial chirp prior to focusing each beamlet onto diffraction grating 140. In this embodiment, the spatial chirp is imposed on each beamlet by a spatial chirper 120, which may include, for example, a dispersive element 124 disposed between a pair of lenses ($f_1$) 122 and ($f_2$) 126. Lenses ($f_1$) 122 are positioned between the broadband fiber array 110 and dispersive elements 124 to collimate the output from the array. Lenses ($f_2$) 126 are positioned confocal to the dispersive elements so that the beamlets are spatially tiled at Fourier plane 128, which is positioned confocal to lens 130. Proper tiling of the spatially-chirped beams, at Fourier plane 128, permits lens 130 and grating 140 to combine the beamlets spectrally into a single collimated output beam, which may then be passed through an output coupling mirror 150 as shown. The output coupling mirror 150 reflects a fraction of the collimated output beam power back to the broadband fiber array so that lasing oscillation can occur. The foregoing approach effectively synthesizes a spatially and spectrally dispersed source of laser light at the Fourier plane 128 that is analogous to a continuously distributed monochromatic fiber array 10 required for conventional, narrow bandwidth SBC.

Figure 3:
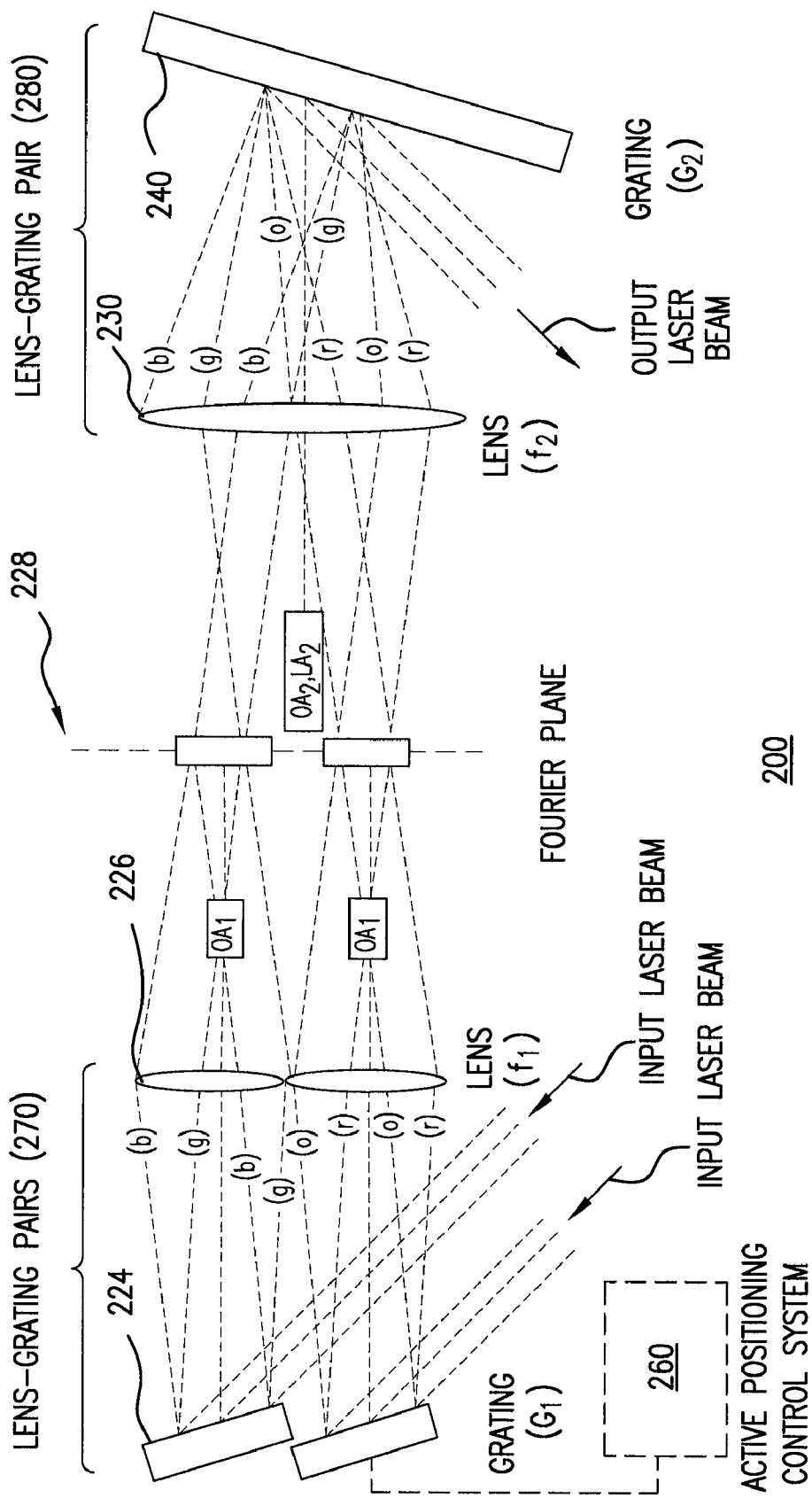
FIG. 3 depicts a broadband SBC system in accordance with an embodiment of the present invention.

FIG. 3 depicts another embodiment of a broadband SBC system 200 in accordance with the present invention. Broadband SBC system 200 is similar to the system shown in FIG. 2 but includes an array of lens-grating pairs 270 that impose a spatial chirp on each beamlet. Specifically, system 200 includes an array of input laser beams or beamlets, e.g., from a broadband fiber array, an array of lens-grating pairs 270 corresponding to the number of input beamlets, and a final lens-grating pair 280. For convenience, two input beamlets of different color and two lens-grating pairs 270 are shown; however, it will be appreciated that the concept can be generalized to N polychromatic input source beamlets and N lens-grating pairs 270, by appropriate selection and arrangement of the lens-grating pairs. Each lens-grating pair 270 includes a grating ($G_1$) 224 and a lens ($f_1$) 226 with a focal length $f_1$ and optic axis ($OA_1$) positioned confocal to the grating so as to focus the diffracted light onto a plane 228 referred to herein as the "Fourier plane," such that the spectral components of the broadband collimated laser beams are distributed transversely, as indicated schematically by the rainbow color effect. In this way, each lens-grating pair 270 functions as a spatial chirper. Lens-grating pair 280 includes a lens ($f_2$) 230, with lens axis ($LA_2$) and optical axis ($OA_2$), and a diffraction grating ($G_2$) 240, arranged such that the optical axis ($OA_2$) of lens ($f_2$) 230 is transversely displaced from the optic axes ($OA_1$) of the spatial chirper. The system may also include an output coupling mirror of the type shown in FIGS. 1 and 2.

Figure 4:
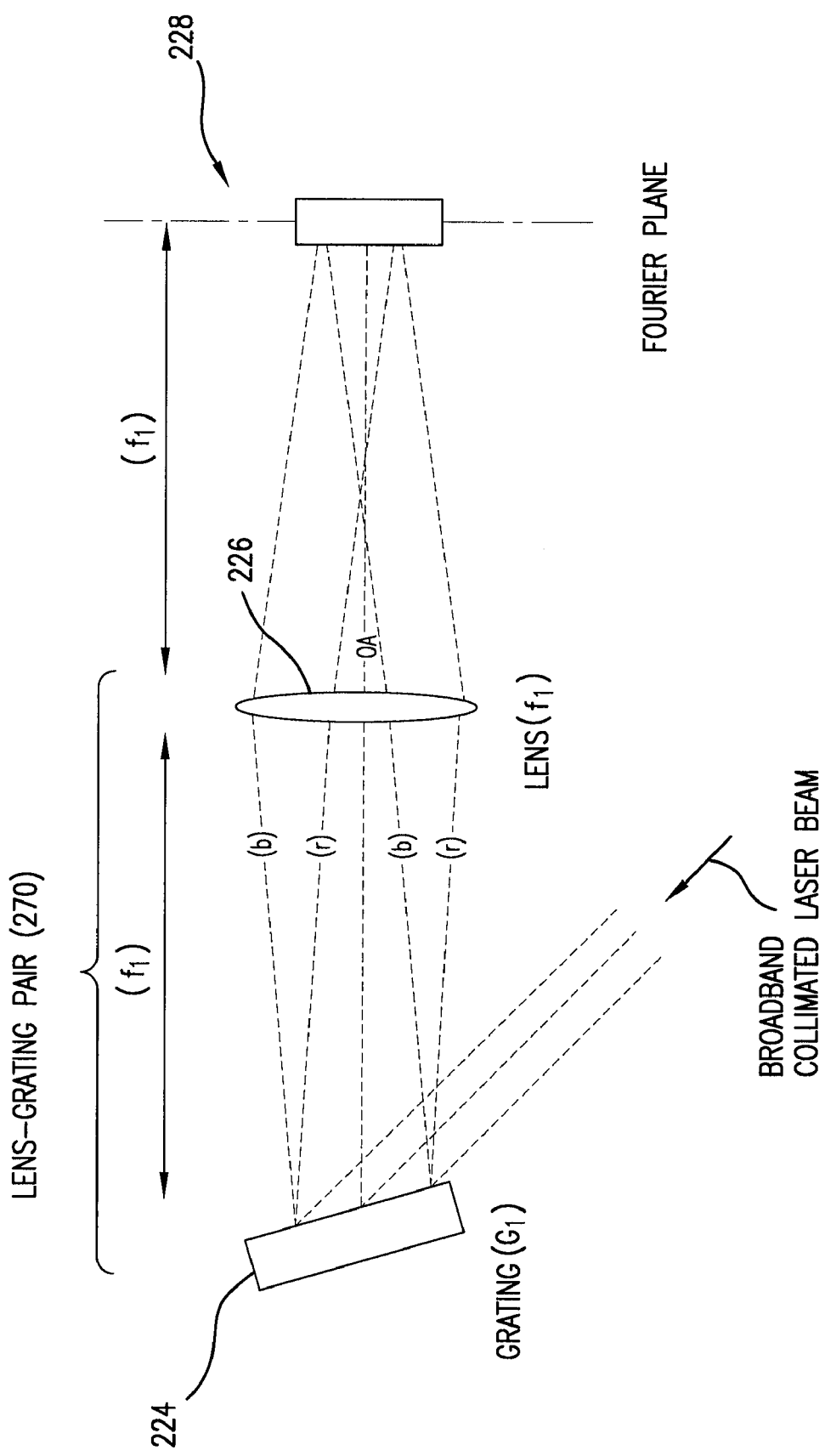
FIG. 4 depicts a lens-grating pair for applying a spatial chirp in accordance with an embodiment of the present invention.

FIG. 4 depicts a single lens-grating pair 270 of system 200 to demonstrate how a lens-grating pair can be used as a spatial chirper in accordance with an embodiment of the present invention. As can be seen, a polychromatic, broadband collimated laser beam diffracts from grating ($G_1$) 224, which angularly disperses the beam's spectral components, as indicated by the blue (b) and red (r) rays. A lens 226, of focal length $f_1$, is placed confocal to grating ($G_1$) 224, and the diffracted light is focused onto plane 228 located $f_1$ downstream of lens 226. As mentioned above, plane 228 is referred to as the "Fourier plane," because the spectral components of the broadband collimated laser beam are distributed transversely, as indicated schematically by the rainbow color effect.

Figure 5:
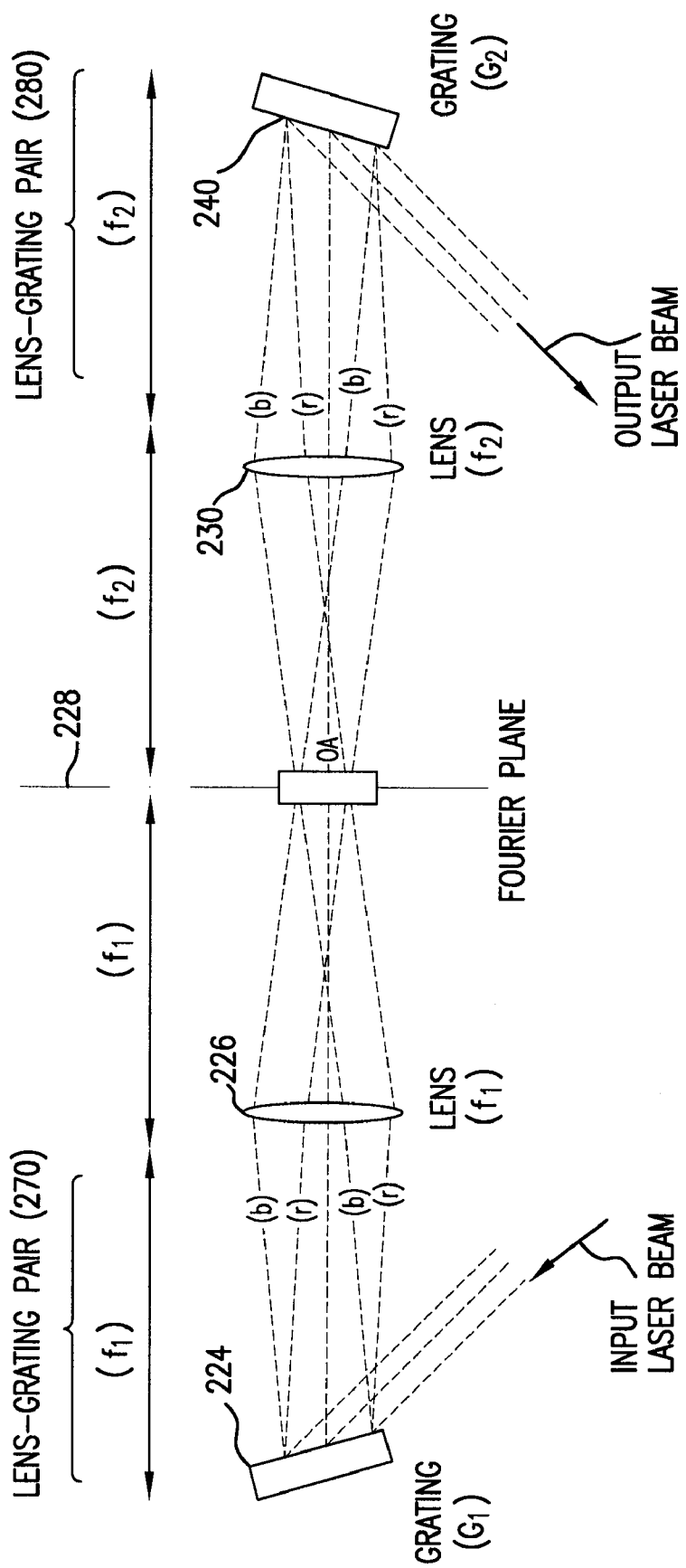
FIG. 5 depicts two lens-grating pairs, arranged in a symmetric configuration about a Fourier plane.

FIG. 5 depicts a lens-grating pair 270 and a lens-grating pair 280, arranged collinearly on optic axis (OA) in a symmetric configuration about the Fourier plane 228 to demonstrate the concept of creating a spatial chirp using a first lens-grating combination and undoing the spatial chirp using a second lens-grating combination. In this optical arrangement, the original polychromatic, broadband collimated laser beam is, essentially, reconstructed as the output laser beam. This is equivalent to positioning a plane mirror at the Fourier plane 228 to retroreflect the dispersed spectrum back through the original lens-grating pair 270.

Figure 6:
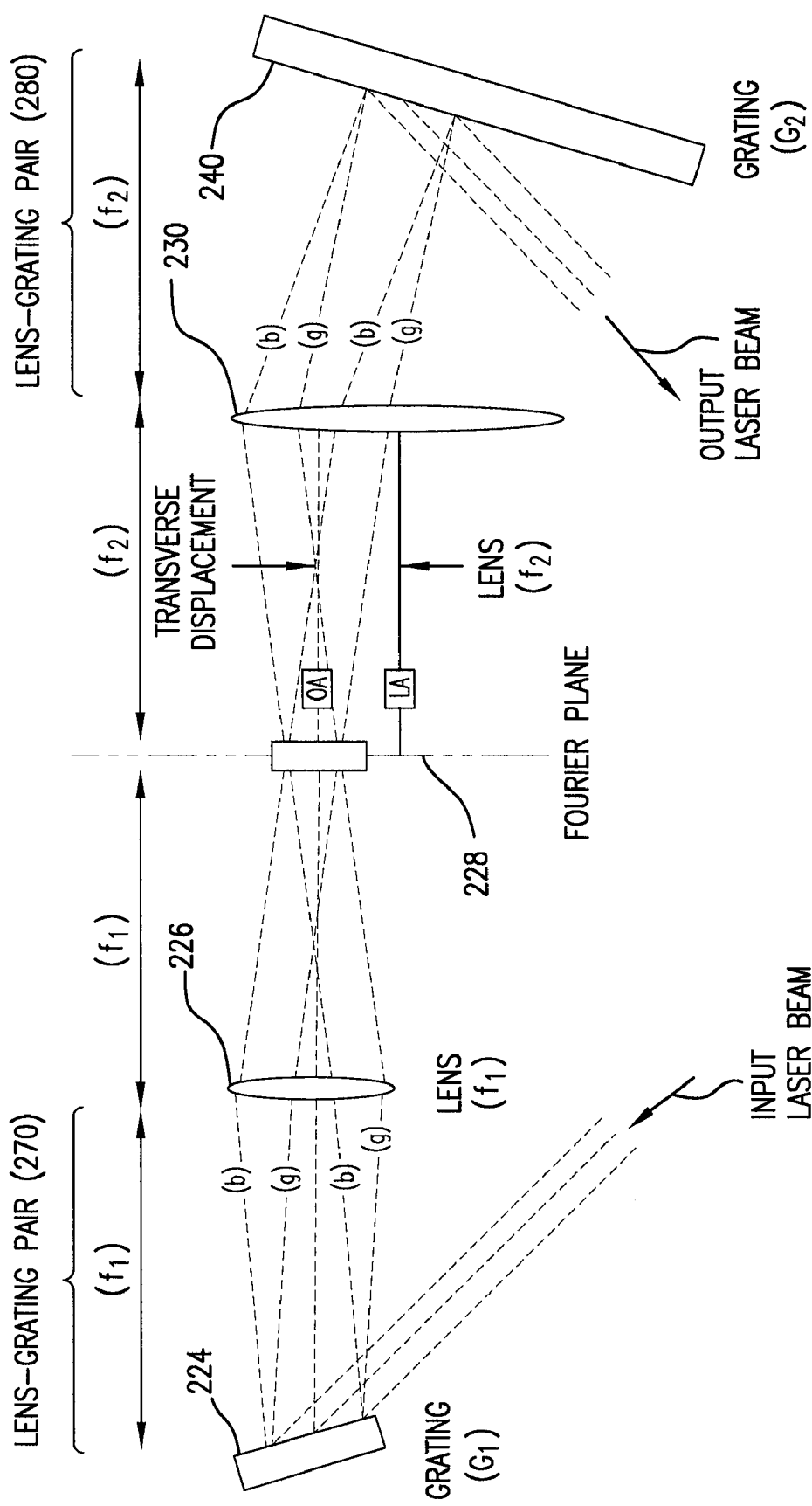
FIG. 6 depicts a first lens-grating pair and a second lens-grating pair, in accordance with an embodiment of the present invention.

FIG. 6 depicts a single lens-grating pair 270 of system 200 to demonstrate the effect of displacing the lens-grating pair relative to the optical axis of the second lens-grating pair 280. Here, lens-grating pair 280 includes lens ($f_2$) 230, with lens axis (LA), and grating ($G_2$) 240, which are transversely displaced with respect to the optical axis (OA) of lens-grating pair 270. The input laser beam's spectral components are indicated in FIG. 6 by the blue (b) and green (g) rays. A comparison of FIGS. 5 and 6 reveals, to a first order (ignoring aberrations), that the only impact of this transverse displacement is to relocate the footprint of the output beam on grating $G_2$ by the same amount as the original displacement. It will be appreciated that the system 200 shown in FIG. 3 is a combination of N lens-grating pairs arranged in a linear array transverse to the optical axis of the second lens-grating pair.

In operation of the system 200, each input broadband collimated laser beam is diffracted by a respective grating $G_1$, which angularly disperses the beam's spectral components, as indicated by the blue (b) and green (g) rays for the first lens-grating pair 270, and the red (r) and orange (o) rays for the second lens-grating pair 270. Each respective lens $f_1$ focuses the spatially-chirped beam onto Fourier plane 228, which produces a tiled spectrum. Advantageously, proper tiling of the spatially-chirped beams, at Fourier plane 228, permits lens-grating pair 280 to combine the beamlets spectrally into a single collimated output beam. Viewed from a different perspective, the Fourier plane 228 may be considered a source of N virtual fiber lasers, each emitting a monochromatic, diverging beamlet. Advantageously, the optical arrangement on the right-hand-side of the Fourier plane 228 corresponds to a canonical situation of SBC of N narrow-bandwidth fiber lasers.

Figure 7:
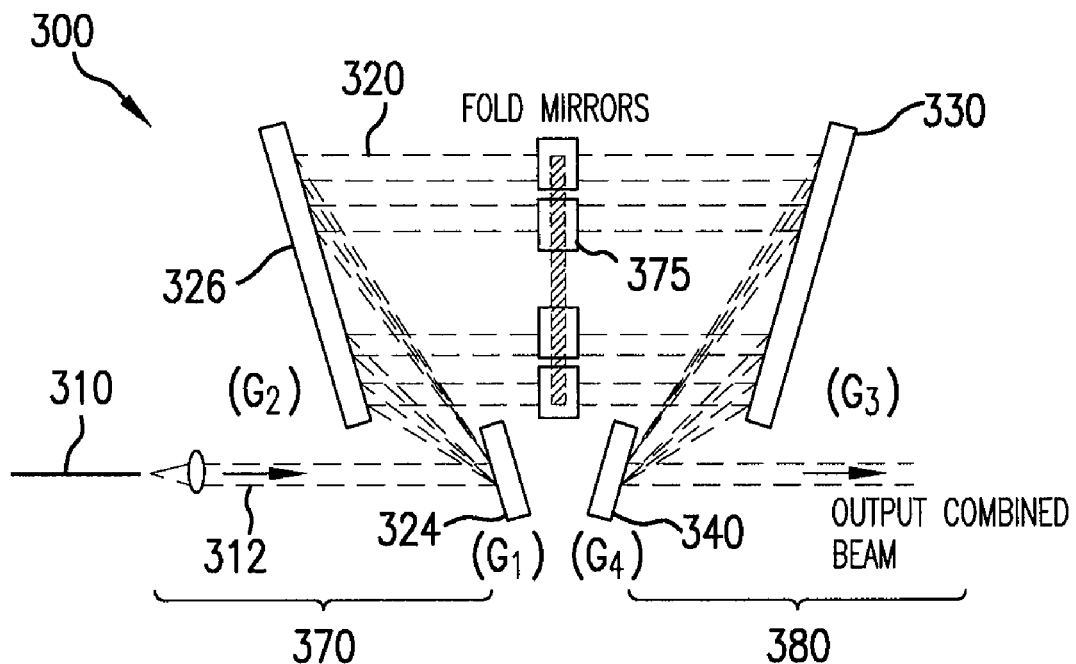
FIGS. 7 and 8 are side and top views, respectively, of another embodiment of a broadband SBC system in accordance with the present invention.
Figure 8:
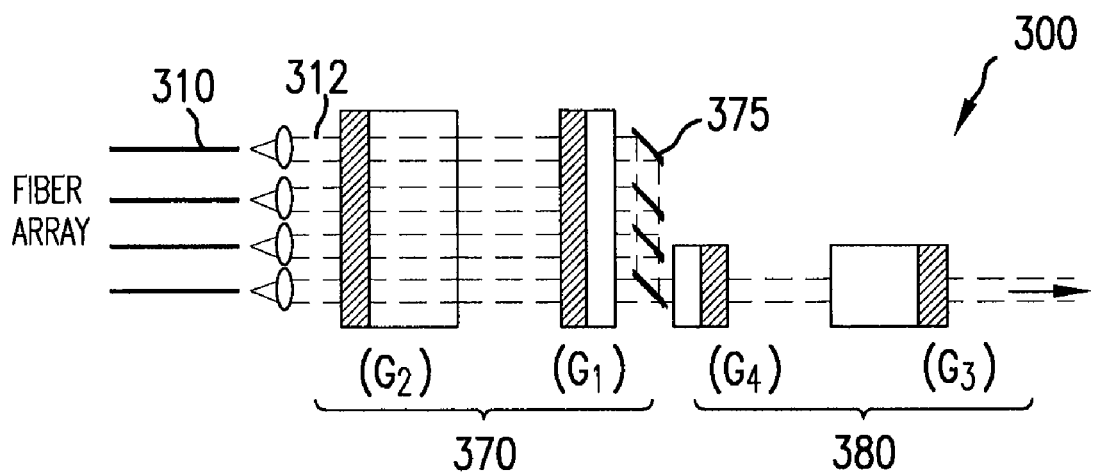

FIGS. 7 and 8 depict another embodiment of a broadband SBC system 300 in accordance with the present invention in which an input grating pair 370 is used as a spatial chirper 320 to impose a spatial chirp on each beamlet, while an output grating pair 380 is used for spectral beam combination. More specifically, system 300 includes an array of input laser beams or beamlets 312, e.g., from a broadband fiber array 310, an array of lenses configured to collimate the beamlets, and a pair of grating pairs 370 and 380 arranged symmetrically about a plurality of fold mirrors 375 in the plane of symmetry such that the first grating pair 370 imposes a spatial chirp on each collimated beamlet and spatially tiles the chirped beamlets at the plane of symmetry, or the Fourier plane, the mirrors direct the spatially tiled beamlets to the output grating pair, and the output grating pair 380 combines the beamlets into a single beam. For convenience, four input beamlets 312 are shown; however, it will be appreciated that the concept can be generalized to N input source beamlets. The input grating pair 370 includes a first diffraction grating ($G_1$) 324 positioned to impose a spatial chirp on the input beamlets and a second diffraction grating ($G_2$) 326 positioned to receive the chirped beamlets and spatially tile them at the plane of symmetry depicted by the rainbow effect. In the embodiment shown, the spatial tiling is advantageously performed in a plane orthogonal to the plane of dispersion for compactness. Fold mirrors 375 are arranged along the Fourier plane to redirect the spatially chirped beamlets to the output grating pair. Output grating pair 380 includes a third diffraction grating ($G_3$) 330 and a fourth diffraction grating ($G_2$) 340, arranged such that the spatially chirped beamlets are diffracted from the third grating onto the fourth grating and thereby combined into a single output beam. While FIGS. 7 and 8 show a single large input grating pair, in practice these could be discrete elements for each input beamlet.

Figure 9:
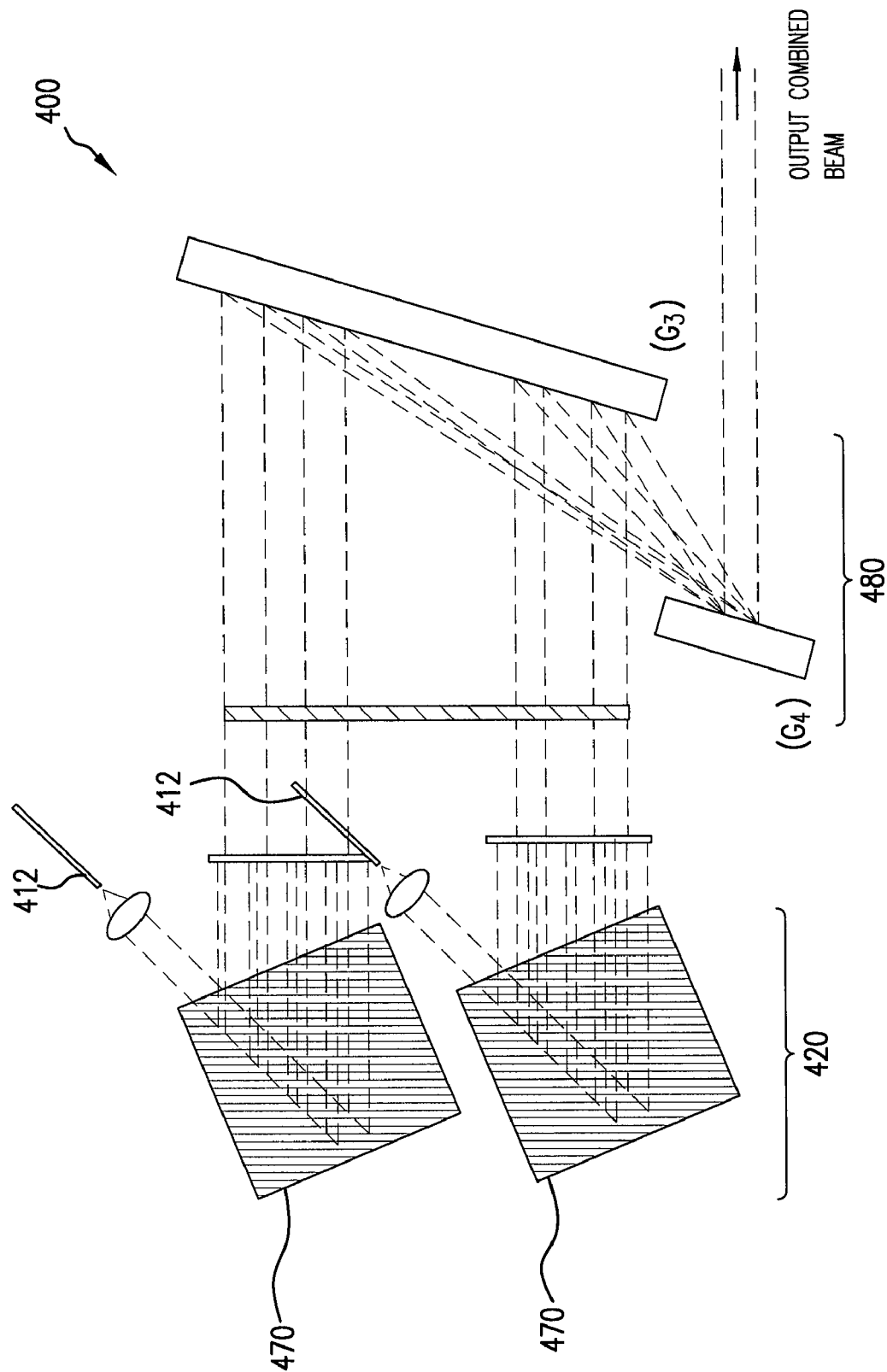
FIG. 9 depicts yet another embodiment of a broadband SBC system in accordance with the present invention.

FIG. 9 depicts another embodiment of a broadband SBC system 400 in accordance with the present invention which is similar to that shown in FIGS. 7 and 8 but in which chirped volume Bragg gratings (CVBG) 470 are used as spatial chirpers 420 to impose a spatial chirp on each beamlet. Like the previous embodiment, the input beamlets 412 are collimated by lenses and an output grating pair 480 is used for spectral beam combination. A CVBG is a volumetric holographic device in which an index modulation is encoded in photothermal glass. With proper design of the modulation profile, the device can be made to reflect different wavelengths at different depths in the material. This device is used to impose a temporal or spectral chirp on a laser pulse. However, if the input laser is incident on the CVBG at an angle with respect to the grating vector, the device will also impose a spatial chirp on the reflected beam owing to the different penetration depths of different wavelengths. Once a beamlet has been spatially chirped, the spatially chirped beamlets can be tiled together at the Fourier plane using folding mirrors (not shown) so that, upon diffraction from final output grating pair 480, the beamlets are overlapped with one another, free of spatial chirp, and copropagating at the diffraction limit.

In one embodiment, the laser array includes about 20 to about 100 wide bandwidth lasers arranged in a one-dimensional linear array having about a 1 mm pitch. In an embodiment, the bandwidth of each laser is about 1 nm, and the output power of each laser is about 1 kW to about 100 kW. In an embodiment, the focal length of each lens $f_1$ within lens-grating pair 270 is about 1 m, while the focal length of lens $f_2$ within lens-grating pair 280 is about 1 m. The gratings $G_1$ and $G_2$ are preferably high power, reflective gratings with dielectric coatings, although any suitable dispersive elements can be used.

From the above, it will be appreciated that embodiments of the present invention advantageously correct the dispersion imposed by an SBC beam-combining optic by "pre-compensating" each broad bandwidth fiber array beamlet prior to combination into a single, collimated output beam. Systems and methods contemplated by the present invention may be applied to various applications in which diffraction limited BQ and high power output are required, such as, for example, laser weapons systems for missile defense, artillery defense, precision strike, etc. Furthermore, an active positioning control subsystem may be used to accurately tile (i.e., position, the spatially-chirped spectra at the Fourier plane) by adjusting the position or orientation of one or more of the optical components, e.g., as shown by broken lines at 260 in FIG. 3.

While the present invention has been described in conjunction with specific embodiments thereof, many alternatives, modifications and variations will be apparent to those skilled in the art. For example, while it is preferred to use reflective gratings with dielectric coatings as dispersive elements, it will be appreciated that any suitable dispersive elements can be used, including without limitation reflective or transmissive gratings. Furthermore, the lenses within lens-grating pairs may be transmissive elements as shown or curved mirror substrates of appropriate dimensions. Moreover, while it is preferred to use a laser fiber array, any broadband laser sources can be used. Accordingly, the preferred embodiments of the invention as set forth herein, are intended to be illustrative, not limiting. Various changes may be made without departing from the true spirit and full scope of the invention as set forth herein.

What is claimed is:

1. A method for combining a plurality of laser beamlets to form a single collimated output beam using spectral beam combination, comprising the steps of:

emitting a plurality of laser beamlets from a plurality of broadband laser sources;

applying a spatial chirp to each beamlet using a spatial chirper including at least one dispersive element arranged to produce a transverse distribution of spectral beam components at a Fourier plane; and combining the spatially-chirped beamlets into a single collimated output beam using a combiner including at least one dispersive element arranged to remove the spatial chirp imposed by said spatial chirper.

2. The method of claim 1, wherein the spatial chirper includes a plurality of lens-grating pairs, and wherein said step of applying a spatial chirp to each beamlet includes diffracting each beamlet using a grating and focusing each diffracted beamlet on a Fourier plane using a lens.

3. The method of claim 1, wherein the spatial chirper includes a plurality of grating pairs including first and second gratings, and wherein said step of applying a spatial chirp to each beamlet includes diffracting each beamlet using a first grating of a grating pair and focusing each diffracted beamlet on a Fourier plane using a second grating of a grating pair.

4. The method of claim 1, wherein the spatial chirper includes a plurality of chirp volume Bragg diffraction cells, and wherein said step of applying a spatial chirp to each beamlet includes diffracting each beamlet using a chip volume Bragg diffraction cell.

5. The method of claim 1, further comprising actively controlling the position of at least one optical element of the spatial chirper using an active positioning control subsystem so that the beamlets are tiled at the Fourier plane.

* * * * *